UNITED STATES PATENT OFFICE 2,307,725

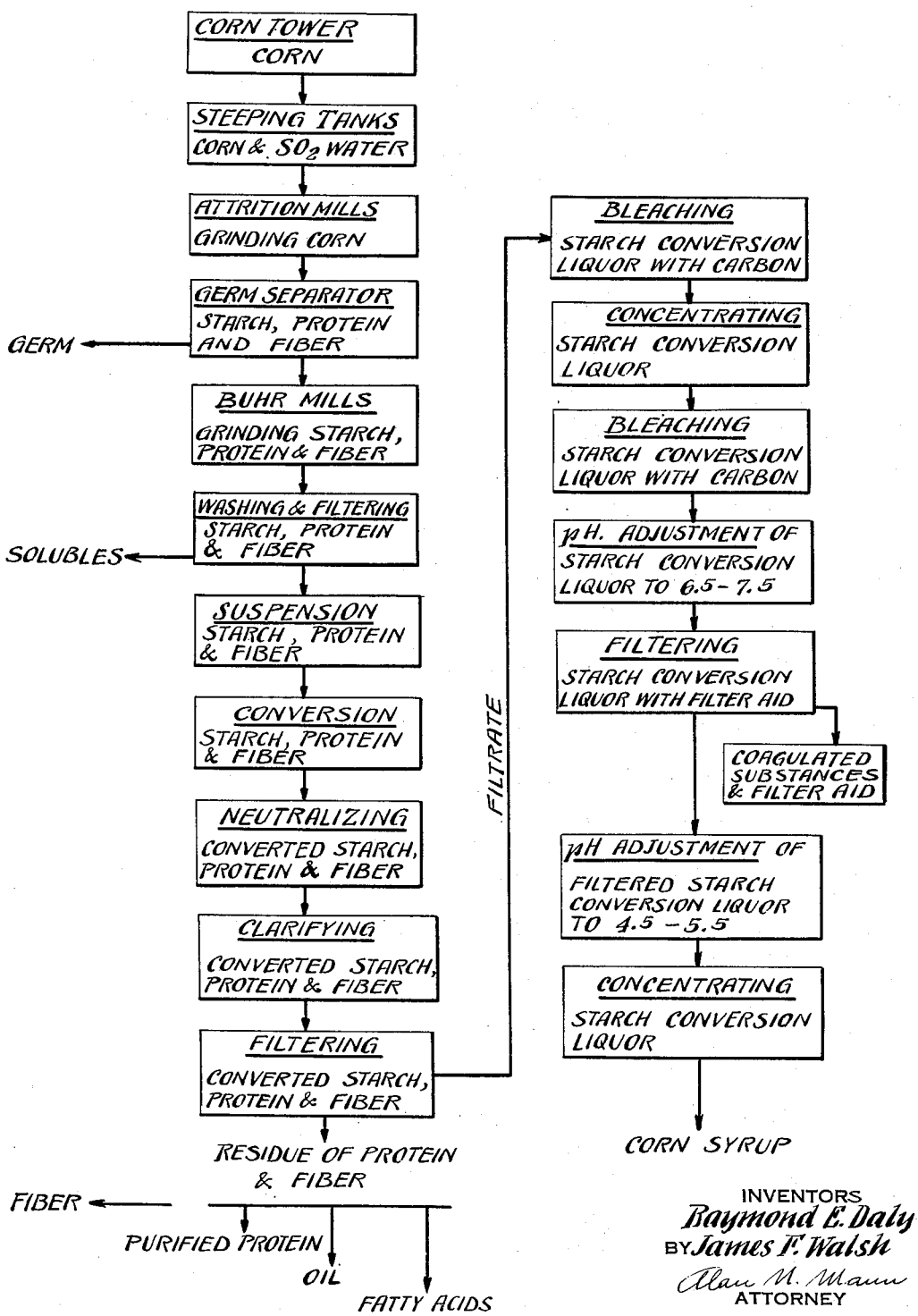

STARCH CONVERSION PROCESS

Raymond E. Daly, Chicago, Ill., and James F. Walsh, Tuckahoe, N. Y., assignors to American Maize-Products Company, a corporation of Maine Application May 14, 1940, Serial No. 335,119

3 Claims. (Cl. 127—39)

Our invention relates to starch conversion processes and products and more particularly to an improved process by which high yields of starch conversion products are obtained and the conversion of the starch may be effected in the presence of the insoluble protein and fiber constituents normally associated with the starch in the amylaceous grains and tubers. This application is a continuation-in-part of our application Serial No. 208,544 filed May 18, 1938.

The process of this invention covers generally the conversion of starchy materials into high quality products after removal of the soluble proteins and oil, if any, from the starchy material but without the necessity of removing the insoluble proteins and fiber, with which the starch is normally associated. Conversion of this starch-protein-fiber mixture prevents the usual loss of the starch occluded to these other components which are normally separated from the starch in whole or in part prior to conversion. Processing and equipment are likewise substantially reduced. The conversion operation is carried out so as to prevent decomposition or other objectionable effects in the protein and fiber.

Our process is applicable generally to any suitable type of amylaceous materials including the cereal or grain starches and the root and tuber starches, which contain starch, protein and fiber or cellulosic material. Examples are, corn, potatoes, wheat, rice, peas, beans and tapioca. For purposes of illustration the process is described hereinafter with particular reference to corn and potatoes (sweet or Irish potatoes) with which satisfactory commercial results have been obtained. The principles of the process may likewise be applied to any other of the suitable starchy materials with appropriate modifications.

In the manufacture of corn syrup and similar starch conversion products heretofore, it has been the usual custom to first separate the starch as completely as possible from all of the other constituents of the corn before subjecting the starch to the conversion treatment, that is, to convert it into corn syrup and the like. A marked improvement upon this usual prior art procedure is disclosed in our Patent No. 2,094,558 issued September 28, 1937, and one phase of the present invention is an improvement upon the process disclosed in that patent. In accordance with our above patented process the commonly used tabling operation for separating the starch from the gluten is eliminated with consequent saving in time and labor and with production of a higher yield of starch. The process was based upon the discovery that the water soluble proteins interfere with the starch conversion action but the water insoluble proteins do not so interfere and accordingly conversion of the starch may be satisfactorily effected in the presence of the insoluble proteins provided the soluble proteins and other soluble substances normally contained in the starch have been removed prior to conversion preferably by repeated washing of the ground degerminated corn with water.

In accordance with our present invention we have discovered further that substantial savings in the cost of production of converted products, and high yields thereof over the conventional prior art processes, can be obtained and also that appreciable advantages over our above patented process may be had, by subjecting substantially all of the corn constituents except the germ and solubles to the conversion action. In other words, we have found that the starch conversion process may be carried out in the presence of some or all of the cellulose or fiber component of the starch as well as in the presence of all of the other constituents of the corn except the germ and soluble substances. By this improved process the yield of starch over the usual prior art processes is about 2½ to 3 pounds more per bushel of corn, and about ½ to 1 pound more starch per bushel of corn than that obtained in our patented process. Furthermore, this improved process eliminates the necessity of reels normally used in all of the processes suggested heretofore, for effecting separation of the fiber from the starch and protein components. Elimination of these reels effects substantial saving in time and labor and saving of an appreciable amount of starch that normally remains with the fiber, which is separated from the starch and protein components by these reels.

As above suggested, an appreciable amount of the starchy components of the corn are usually lost when the cellulose or fiber content of the corn is separated from the starch and protein prior to conversion. This is in addition to the substantial amount of starch that adheres to the protein and is lost during the conventional tabling operation to separate the starch from the protein or gluten.

When one attempts to convert the starchy material containing the usual proteins and fiber the conversion is inhibited and requires drastic conversion conditions that decompose the non-starchy components, particularly the fiber, resulting in decomposition products that contaminate the starch and are very difficult to separate and remove. In our process we overcome this disadvantage by first removing from the starchy material the conversion inhibiting soluble proteins which permits the conversion of the starch to be carried out under substantially milder conditions and avoids formation of the undesirable decomposition products.

In addition to obtaining higher yields of starch and starch conversion products, such as corn syrup, our process also provides a source of purified protein, oil other than the oil contained in the corn germ, fatty acids, and purified cellulose or fiber. The protein and fiber produced by our process are substantially free of starch and thereby more useful since they may be used for purposes for which the usual protein and fiber with occluded starch are not suitable. The oil and fatty acids that are separated from the other corn constituents in our process during hydrolysis of the starch are also valuable products. These substances are obtained from the endosperm portion of the corn and not from the corn germ.

A feature of our process comprises making certain pH adjustments in the starch conversion liquor to effect removal of coagulated substances, which when allowed to remain in the liquor as is usually the case, will produce a haze or cloudiness on standing.

The conversion treatment for converting the starch in the presence of the insoluble protein and fiber, which has been previously freed of solubles, may be effected in either one stage or in a number of stages. Specific examples of the conditions for single and multiple stage conversion are given hereinafter. In a multiple stage conversion, the first stage may consist of a mild conversion action just sufficient to render the starch soluble and capable of being readily filtered, and thereby enable its separation from the insoluble protein and fiber. This mild conversion may be effected by the use of enzymes or acid or combinations thereof as the starch converting agent and is carried out under mild conversion conditions to avoid decomposition of the associated impurities particularly proteins and fiber. The partially converted starch liquor, after separation from the non-starchy solid components is then subjected to further conversion treatment using either enzymes or acid or both as the conversion accelerating agent to produce the desired final degree of conversion. A preferred procedure is to use acid for the first stage of conversion and to complete the conversion in the second stage with enzymes to give the desired reducing sugars (dextrose and maltose) content. The acid conversion usually would not be carried out beyond a reducing sugars content of about 60% and preferably only to a lower content such as 25% to 45% as its primary purpose is to allow of separating the insoluble proteins and fiber from the solubilized carbohydrates. The subsequent enzyme conversion may be carried out sufficiently to raise the reducing sugars content to a desired higher amount such as 65% reducing sugars.

The process of our invention will be more clearly understood from the following illustrative but non-limiting example taken in conjunction with the accompanying drawing which represents a flow diagram of the process as applied to corn.

Corn from a corn tower or other supply, is steeped in the usual steeping tanks with a solution of sulphur dioxide and water to soften the skin or fiber envelope, after which the corn is passed through attrition mills wherein it is subjected to a grinding treatment sufficient to liberate the germ. The mixture of germs and other corn constituents is then passed through the germ separator which separates the germ from the starch, protein and fiber.

The starch, protein, and fiber produced as above constitute the basic materials to be used in our process. The mixture of these constituents is passed through Buhr mills which grind the starch, protein, and fiber to rather fine particle size sufficient to permit thorough washing of these substances. The resulting ground mixture is washed with water and filtered several times, preferably using fresh water for each washing and filtration. This washing treatment removes from the ground mixture of starch, protein and fiber substantially all of the soluble proteins and other soluble substances present in the corn, which if allowed to remain, would inhibit the subsequent desired starch conversion action. The mixture of washed starch, insoluble protein, and fiber is next suspended in water to provide a suspension of suitable Baumé for conversion.

In the case of a single stage conversion, such as indicated in the drawing, the starch, insoluble protein, and fiber mixture is subjected to proper conditions of temperature and acid to effect the desired degree of conversion of the starch. During this treatment the starch is converted into soluble form, while the protein and fiber remain as insoluble constituents suspended in the resulting starch conversion liquor.

The starch conversion liquor, with suspended insoluble protein and fiber is next neutralized or made less acid by the addition of alkali, to render the several constituents more susceptible of separation. After this treatment the mixture is clarified by passing it through a filter press, and is finally filtered to form a filtrate of the starch conversion liquor and a residue of protein and fiber. The filtrate consisting of substantially solely starch conversion liquor is treated with bone-char or vegetable carbon or other suitable bleaching agent, to bleach the liquor to the desired color, after which the bleached liquor is concentrated by suitable means such as, for example, in a vacuum pan. Following this concentration the liquor is preferably bleached again to further reduce its color.

The bleached starch conversion liquor is now subjected to the above mentioned pH adjustment treatment for removal of small amounts of coagulable substances which, if permitted to remain in the final product, will cause haze and other undesirable characteristics. This pH adjustment consists of primarily adding alkali to the bleached starch conversion liquor until the pH of the resulting liquor is about 4.5 to 5.5, preferably 4.8 to 4.9. After this adjustment, filter aid is added to the liquor and it is filtered to remove the colloidal substances that have been coagulated by this pH adjustment. The filter aid is also removed by this operation. Following this filtering step the pH of the liquor is adjusted again by adding acid until a pH of approximately 4.5 to 5.5 is obtained. The primary purpose of this pH readjustment is to leave the liquor at a pH which will insure stability of the final syrup product.

After the final pH adjustment the starch conversion liquor is concentrated to any desired degree. A desirable range of concentration is from about 38° Bé. to 45° Bé. The concentrated syrup thus produced may be used for any of the purposes for which similar syrups produced by conventional methods, are used. Also, if desired, it may be concentrated and solidified into slab or chip form, such as the sugars known in the trade as "70" and "80" sugars.

One specific but non-limiting example of the single stage conversion operation, generally described above, and subsequent pertinent steps is as follows:

*Example I*

The starch protein and fiber mixture following the washing operation, and being substantially free of solubles, was made up to 14° Baumé and sent to the refinery. Here a charge of 2050 gallons of this suspension had added to it 130 pounds of concentrated acid for each conversion. A standard pressure of 45 pounds of steam was applied for about 17 to 22 minutes. The resulting liquor was neutralized to a pH of about 4.5 to 5.0 by the addition of approximately 50 pounds of soda ash. The resulting conversion liquor was filtered from the protein and fiber and had a reducing value of about 90%, calculated as anhydrous dextrose.

A specific, but non-limiting example illustrating two stage conversion is as follows:

*Example II*

The starch protein and fiber mixtures following the washing operation, and being substantially free of solubles, was made up to 14° Baumé and sent to the refinery for conversion. Here to a charge of 2050 gallons of this suspension is added 35 to 40 pounds of concentrated acid and the suspension is brought up to a pressure of 45 pounds. After holding the conversion at this pressure for from 7 to 11 minutes the mixture is discharged from the converting chamber and is neutralized to a pH of 4.5 to 5.0, with 13½ to 15½ pounds of soda ash. The mixture is then filtered, the filtrate being again acidified with 90 to 95 pounds of concentrated hydrochloric acid and again fed to a converter in which the pressure is again raised and the conversion is carried to completion; that is, to a 90% reducing substance value calculated as dextrose. This is accomplished by holding the conversion at 45 pounds for from 7 to 14 minutes. The converted liquor is discharged from the converter and is neutralized to a pH of 4.5 to 5.0 with 34.5 to 36.5 pounds of soda ash. The neutralized liquors are filtered and bleached in accordance with the regular practice in the art.

*Example III*

The starch protein and fiber mixture following the washing operation, and being substantially free of solubles, is made up to 10 to 20% solution. The starch content of this mixture is pasted in the presence of a small amount of acid at approximately 180 to 200° F. The mixture is cooled, pH adjusted, and 1 to 5% of a malt diastase is added to the suspension. The temperature and pH used are in accordance with the optimum activity of the malt diastase used. The diastatic conversion is carried to the point where the converted liquor will separate or filter easily from the non-starch solids. The partly converted or filtered liquor is then reacidified and converted to about 30% to 55% reducing sugars calculated as anhydrous dextrose, when the final product is to be a syrup, and to about 70% to 91% when the product is a sugar. The liquor is finally neutralized, filtered, and bleached in accordance with the usual custom. The purpose of the enzyme pretreatment is to remove the starch from the non-starch portion with a minimized reaction or breaking down of the non-starchy solids.

The application of the process of this invention to potatoes will be understood from the following general description and specific examples.

When starch conversion syrups and sugars are produced from potato starch the potatoes are normally washed, pulped to a very finely divided mass and the fiber removed by screening before the conversion treatment is applied. Removal of the fiber may be effected by passing the pulped potato containing a mixture of starch, fiber and protein over perforated revolving screens or shakers having cloth bottoms through which the starch and protein materials will pass but the fibers will not pass, and are discharged. The mixture of starch and protein is then further refined by various treatments before conversion.

In accordance with the principles of this invention we have found that it is not necessary to remove the fiber from the potatoes prior to conversion and it is desirable to maintain the fiber in the conversion mixture so as to save the starch which normally occludes to the fiber and is lost if the fiber is removed prior to conversion. This fiber, similarly to corn fiber is subject to decomposition under drastic conversion conditions which would be required in the presence of the soluble conversion inhibiting proteins. However, we have been able to avoid this disadvantage in our process since we have discovered that the large amount of soluble proteins normally present in potatoes may be substantially removed by washing of the potatoes with water prior to conversion. When these soluble proteins are removed conversion may be effected more easily and efficiently.

The ordinary American white potatoes contain a protein content of about 21% and we have found that about 20% of this protein is soluble and removable by repeated washing of the potatoes with water. The potatoes contain in addition to these proteins about 72% of starch and about 7% fiber. To prepare these potatoes for use in our process they are washed to remove surface dirt and if desired are buffed with rotating brushes to remove the outer dark skin leaving a substantial amount of fiber, protein and starch. The thus cleaned potato is then pulped to a fine state by running through a pulping machine such as the Fesca pulping machine or the Malinsky & Proskop pulper. Any additional necessary pulping or grinding may be obtained by use of stone mills. This treatment gives a pulp which comprises primarily finely dispersed starch cells and comminuted proteins and fiber.

After pulping and grinding as above, the mass is run over washing type filters such as American or Oliver filters and is washed substantially free of solubles. By this procedure the original content of about 20% soluble protein is reduced to a content of about 0.05% or less. The amount of insoluble protein remaining in the washed comminuted potatoes is relatively high; for example, about 1.15%, but we have found that this insoluble protein does not seriously interfere with the conversion of the starch once the soluble proteins have been removed.

The comminuted washed mixture of protein, fiber and starch from the potato is now ready for conversion which may be carried out according to the following illustrative but non-limiting example:

*Example IV*

2,000 gallons of the above described liquor at about 10 to 12 Baumé is charged into the converter along with approximately 60 pounds of 18 Baumé hydrochloric acid. The pressure is raised rapidly with the aid of live steam to about 40 pounds at which pressure it is held for varying lengths of time depending on the degree of conversion desired. For the manufacture of a starch syrup of approximately 40–42 purity (dextrose equivalent) we find that approximately 9 to 11 minutes is sufficient. In the manufacture of dextrose it is necessary to hold the conversion considerably longer, sometimes as long as 30 minutes. Under these conditions there is some tendency for the insoluble protein to decompose to soluble proteins which are hard to remove from the converted liquor, particularly when the conversion has been allowed to go as far as possible, that is substantially 90% conversion to dextrose and we find that we can prevent to a great extent the harmful effects of the decomposition of the protein if we stop the conversion at approximately 40 to 60 purity, neutralize the liquor and filter this material with the aid of approximately 1% by weight of dry substance of a very active and highly absorptive vegetable carbon. Then acidify exactly as before and continue the conversion to substantially 90 purity.

The fiber content of the conversion mixture may be removed at an intermediate stage or at the end of the conversion operation. If the conversion is to be carried out in two stages as above suggested, the fiber will normally be removed in between stages.

With respect to the insoluble protein content of the potato conversion material, we have found that a portion of this insoluble protein is hydrolyzed during the conversion into soluble form and that the soluble protein content increases rapidly as the conversion progresses. We have therefore found it desirable to remove the protein at an intermediate stage of the conversion before it becomes too soluble to be removed by filtration. In the usual case we prefer to convert the potato starch to a conversion liquor having a reducing sugars content of about 50% calculated as dextrose on a dry weight basis; then bleach the conversion liquor, filter and complete the conversion of the filtered liquor as above outlined.

The conversion liquor prepared in the above manner to a point where its dextrose equivalent is about 90 is of very high quality and can be used in commercial form as a solidified dextrose, or can be crystallized in the conventional manner to yield a highly purified dextrose. If the acid conversion is stopped at an intermediate stage, such as for example, at a dextrose equivalent of about 42, the conversion may then be completed to the desired degree by treatment of the conversion liquor with diastatic enzymes such as described above for the corn starch conversion process. An example of this type of two-stage conversion to produce a sweet, non-crystallizing syrup is as follows:

*Example V*

About 2,000 gallons of the above described protein and fiber suspension at 12 Baumé and containing approximately 5,000 pounds of starch, is converted with acid as described above, to a dextrose equivalent of about 42. At this point the conversion liquor is neutralized and the temperature lowered to about 120° F. To this liquor is added approximately 20° diastatic barley malt and the liquor further converted with this malt to a dextrose equivalent of approximately 60. The thus converted liquor is then refined by bleaching, filtering and concentrating in the usual manner. The resulting syrup has a pleasant sweet flavor and a relatively high maltose content.

Various modifications and changes may be made in the process described hereinabove, without departing from the scope of our invention, some of the novel features of which are defined in the appended claims.

We claim:

1. A process of producing potato starch conversion products comprising pulping the potato, washing the resulting ground mixture of potato starch, protein and fiber with water to reduce the soluble protein content to not substantially more than 0.05%, converting the washed starch, insoluble protein, and fiber mixture with a starch conversion acid, heat and pressure which in the absence of soluble proteins are sufficient to effect the desired starch conversion but not sufficient to cause decomposition of the fiber, adjusting the pH of said liquor to approximately 4.5 to 5.5 to effect coagulation of insoluble materials, and then removing the insoluble materials.

2. A process of producing starch conversion products from potatoes which comprises pulping the potatoes, washing the pulped product thoroughly with water to remove substantially all soluble proteins which if not removed inhibit conversion, converting the washed mass with a starch conversion acid, heat and pressure so as to convert the starch present without objectionable decomposition of fibrous material of the pulp, neutralizing the conversion liquor to a pH of about 4.5 to 5.5, separating insoluble protein and fiber from the neutralized starch conversion liquor, and then refining and concentrating the neutralized liquor to form a syrup.

3. A process for producing a high yield of starch conversion products from potatoes containing substantial amounts of fiber and soluble and insoluble proteins without first removing the insoluble non-starchy components, the process comprising pulping the potatoes, thoroughly washing the resulting pulped mass with water to remove substantially all of the soluble proteins which normally inhibit conversion, converting the remaining washed mixture of starch, insoluble proteins and fiber with starch conversion acid, heat and pressure so as to solubilize the starch with a minimum degrading action on the protein and fiber, separating the solubilized starch from the insoluble proteins and fiber, and then completing conversion of the separated solubilized starch to give a starch conversion liquor.

RAYMOND E. DALY.
JAMES F. WALSH.